June 19, 1934.  H. C. EDWARDS  1,963,614
INTERNAL COMBUSTION ENGINE
Filed Oct. 30, 1930

Inventor
HERBERT C. EDWARDS.
By
Attorney

Patented June 19, 1934

1,963,614

UNITED STATES PATENT OFFICE 1,963,614

INTERNAL COMBUSTION ENGINE

Herbert C. Edwards, Detroit, Mich., assignor to Packard Motor Car Company, Detroit, Mich., a corporation of Michigan Application October 30, 1930, Serial No. 492,121

5 Claims. (Cl. 123—90)

This invention relates to internal combustion engines and more particularly to the lubrication of push rod structures.

In engines having their push rods projecting through the crank case so that a portion thereof is in an exposed relation exteriorly of the crank case, oil works out of the rod sleeves or guides and is free to move in an unrestricted manner. Such leakage of the oil is objectionable under any circumstances, but is especially undesirable when the engine is employed as the power plant for an aeroplane or an automobile because the oil travels rearwardly and spatters the windshield and amongst other things obscures the operator's vision.

An object of the invention is to provide a novel and improved internal combustion engine in which the above mentioned objectionable features caused by the oil escape from the push rod guides are eliminated.

Another object of the invention is to provide an internal combustion engine having push rods extending through the crank case in which oil in suspension in the crank case is utilized to lubricate the push rod guide sleeves without leakage to the engine exterior.

A further object of the invention is to provide an internal combustion engine in which lubricant around the plungers, reciprocating in guides extending through the crank case, of rod structures is collected and returned to the crank case.

Still another object of the invention is to provide an internal combustion engine in which the push rod and guide structures therefor are utilized to produce suction which will collect lubricant from the bearing surfaces adjacent the exterior end of the guides and will return the same under pressure to the crank case.

These and other objects of the invention will appear from the following description taken in connection with the drawing, which forms a part of this specification, and in which.

Figure 1:
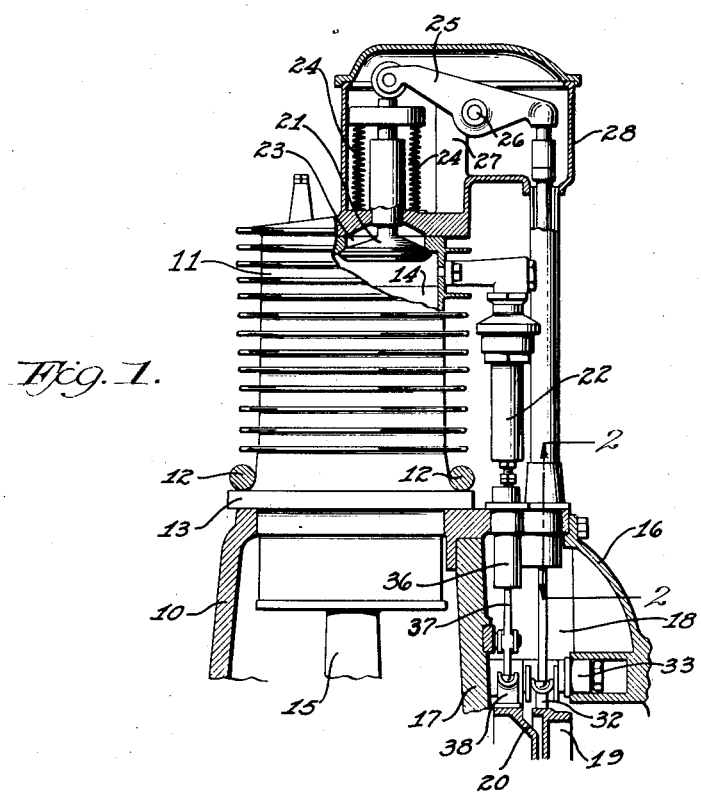
Fig. 1 illustrates an elevational view of a fragmentary portion of a radial type of engine having portions broken away and in section to show the interior of the crank case and the valve and push rod construction.
Figure 2:
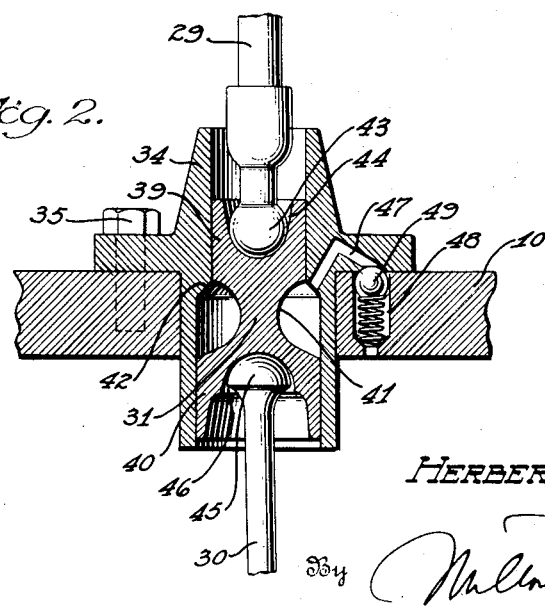
Fig. 2 is a fragmentary sectional view of the valve push rod structure taken on line 2—2 of Fig. 1.

In the drawing, 10 represents a barrel-like crank case from which a plurality of cylinders, as indicated at 11, extend radially and are secured in position therewith by a pair of compression bands 12 which extend around shoulders 13 projecting from the cylinders and bearing against the crank case. A piston 14 is reciprocated within the cylinder and is connected to a crank shaft (not shown) by means of the connecting rod 15 in the usual manner.

The crank case is provided with a rear cover 16 and is divided into compartments by an interior transversely extending reinforcing wall 17. The compartment 18 houses a pair of cams 19 and 20, which are driven from the crank shaft in a conventional manner, and mechanism which is actuated thereby to operate the valve 21 and the fuel injection device which is indicated generally at 22. The valve 21 is arranged to close the interior end of a passage 23 which extends through the head of the cylinder and through which air is drawn into the cylinder and exhaust is expelled from the cylinder by the piston.

It will be understood that the engine illustrated is of the four-cycle type, the air charges being drawn into the cylinder on the suction stroke and then compressed on the compression stroke during which time atomized liquid fuel under high pressure is injected into the cylinder by the injection device 22. The fuel mixture, so formed, ignites under compression and produces a working stroke which is followed by an exhaust stroke. The valve is normally closed by a plurality of coil springs 24 and is mechanically opened by the rocker 25 which is pivoted at 26 to a bracket 27 extending above the cylinder head. An enclosing casing 28 surrounds the valve structure and the rocker for operating the same. It will be understood that the rocker is moved to hold the valve open during the exhaust and intake strokes and that the valve is closed during the compression and working strokes.

A push rod structure is arranged intermediate the rocker 25 and the cam 19 and includes an outer push rod 29, an inner push rod 30, a plunger 31 intermediate the inner and outer push rods and a slipper 32 which is pivoted upon the shaft 33 carried by the walls 16 and 17.

The plunger 31 is reciprocable in a guide sleeve 34 which projects through an opening in the wall of the crank case and is secured thereto by suitable bolts 35. A similar sleeve 36 extends through an opening in the crank case and push rod mechanism including the rod 37 and the slipper 38 is arranged to be actuated by the cam 20 for producing injection strokes of a plunger (not shown) contained within the injection device. The push rods 37 and 30 rest upon the free end of the slippers 38 and 32 respectively and reciprocate the push rods when the lobes of the cams 19 and 20 contact therewith during their rotation. The details of the engine so far described are more completely set forth in a co-pending application to Lionel M. Woolson, Serial No. 358,899, filed April 29, 1929, now U. S. Patent No. 1,896,387 issued Feb. 7, 1933. The plunger 31 provides a bearing for the articulated push rod structure and is also designed to serve as a seal to prevent lubricant from splashing through the crank case adjacent the push rod structure, but heretofore unless some form of packing was used I have found that there is always some leakage of lubricant to the exterior of the crank case from between the plunger and the guide sleeve. This invention relates to a novel form and construction of plunger and guide sleeve which are associated with the adjacent crank case so that oil working between the outer end of the plunger and the guide sleeve will be collected and shunted by means of pressure back into the crank case so that it will not escape to the exterior of the crank case.

As a means of producing this self-drying type of push rod structure, the spaced plunger ends 39 and 40 are of two different diameters and the portion 41 thereof intermediate such ends is relieved so that there is a circular recess intermediate the ends. The sleeve 34 is also formed in two interior diameters having a connecting shoulder 42, and in this manner the two-diameter plunger reciprocates in portions of the sleeve having complementary diameters.

The outer push rod 29 is provided with a spherical head 43 which engages in a pocket 44 formed in the outer end of the plunger while the inner push rod is formed with a spherical head 45 which engages in a pocket 46 formed in the inner end of the plunger, and the tension of the springs 24 will maintain this articulated push rod structure together axially because a force is exerted inwardly causing the heads 43 and 45 to always engage against the plunger in the pockets and causing the inner push rod to bear against the associated slipper 32 maintaining the same in contact with the periphery of the cam 19.

Oil within the compartment 18 is held in suspension or is splashed through the rotation of the cams 19 and 20 and, therefore, it will work its way between the sleeve 34 and the plunger 31 in a direction outwardly of the crank case and in this manner serve as a lubricant for the push rod plunger and its guide. The fit between the plunger and its guide is close, but due to reciprocation and manufacturing inaccuracies and wear there will normally be a certain degree of outward movement of the lubricant which will result in leakage exteriorly of the crank case unless provision is made to prevent the same. It will be seen that as the plunger 31 moves inwardly of the guide sleeve suction is created intermediate the smaller plunger end and in the recess formed by the relief 41 so that any oil which has worked between the outer end of the plunger and the guide will be drawn back and collected in the recess. In order that this collected oil may be transferred to the crank case, I provide a suitable duct means which in this instance consists of a passage 47 in the guide sleeve and a communicating passage 48 extending through the crank case. In order to prevent the plunger from drawing oil through the duct directly from the crank case, I provide a one-way, spring-pressed valve 49 which is adapted to seat intermediate the passages 47 and 48. The oil collected through suction or vacuum within the relief recess 41 in the piston will be forced through the passages 47 and 48 back into the crank case under pressure developed in the sleeve as the plunger moves in its outward stroke, and this developed pressure is sufficient to open the valve 49 so that there is a direct communication between the relief recess in the piston and the interior of the crank case and the collected oil is shunted back to the crank case remote from the plunger.

The only way in which oil can get into the interior of the push rod bearing device is to pass through the open end of the sleeve with which the larger diameter portion of the plunger engages. When the oil reaches the relieved portion of the plunger, it will be collected, and as the larger diameter portion of the plunger moves toward the shoulder 42, the lubricant will be forced out through the passage 47. The vacuum which is created by the plunger, in the relieved portion thereof and between the bearing surfaces of the small diameter portion of plunger and the sleeve, continues during its inward movement and the first part of its outward movement. As the larger diameter portion of the plunger approaches the passage 47, sufficient pressure is developed to displace collected oil and to force a small amount thereof between the bearing surfaces of the smaller diameter portion of the plunger and the sleeve. It will thus be seen that the plunger serves to force lubricant between the bearing surfaces of its small diameter portion and the sleeve during the last portion of the compression stroke, and at all other times it will create a vacuum or a suction which will tend to draw such lubricant back into the relieved portion of the plunger. In this manner, the smaller diameter portion of the plunger is lubricated and at the same time, the lubricant is controlled so that it will not become excessive enough to move outwardly through the sleeve.

It will be seen that with the structure herein described, suspended oil from the crank case lubricates the bearing surfaces of the plunger of the push rod structure and the guide sleeve which extends through the crank case wall, but at the same time leakage to the exterior of the crank case through the open guide sleeve is substantially prohibited.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In an internal combustion engine having a crank case, a guide bearing sleeve extending through the crank case having the end extending exteriorly of the crank case of smaller bore than the bore of the end portion extending into the crank case, the end of the sleeve extending into the crank case forming the only channel through which oil can move into the interior of the sleeve, a two diameter push rod piston slidably mounted in the bore of the sleeve, and a one way duct means leading from the larger diameter bore of the sleeve at a point adjacent the smaller diameter bore, said larger diameter portion of the piston creating suction in the sleeve in its stroke toward the interior of the crank case to withdraw oil from around the smaller diameter portion of the piston and forcing such oil through the one way duct means in its stroke away from the interior of the crank case.

2. In an internal combustion engine having a crank case, a guide sleeve extending through the crank case wall, said sleeve having a larger interior diameter at its inner end and a shoulder between the two diameters, the inner end of the sleeve being the only channel through which oil can move interiorly of the sleeve, a push rod plunger having axially spaced end portions of diameters similar to the interior of the sleeve and slidably mounted therein, a by-pass leading from the larger diameter bore portion of the sleeve at a point adjacent the junction with the smaller bore portion and communicating with the interior thereof adjacent the shoulder, and a one-way valve in the by-pass opened only by pressure created within the sleeve, said plunger creating a vacuum around the smaller diameter portion thereof during its entire movement in one direction to draw oil therefrom into the space between the end portions thereof and creating pressure on the collected oil during movement in the other direction to discharge it through the by-pass without creating pressure around the smaller diameter and except at the extreme end of its stroke.

3. In an internal combustion engine having a crank case, a guide bearing sleeve extending through the crank case having a two diameter bore extending therethrough, the two diameter portion of the bore being joined by a shoulder having an outlet passage therein, an outwardly opening valve in the outlet passage, the end of the sleeve extending into the crank case forming the only channel through which oil can enter the interior of the sleeve, and a push rod piston slidably mounted in the bore of the sleeve, said piston having a shoulder portion cooperating with the shoulder in the sleeve whereby movement in one direction withdraws any oil from around the smaller portion of the piston and movement in the opposite direction forces such withdrawn oil through the outlet passage.

4. A device for controlling oil in a push rod bearing, comprising a sleeve having an oil outlet port intermediate its ends, a push rod guide plunger in the sleeve, co-operating means associated with said sleeve and said plunger creating a vacuum between one end of the sleeve and the port therein during the movement of the plunger in one direction and maintaining the vacuum during a part of its movement in the other direction, and a one way valve controlling the port.

5. A device for controlling oil in a push rod bearing, comprising a sleeve extending through the crank case wall and having a bore of two diameters and an oil outlet passage leading from the larger bore portion adjacent its junction with the smaller bore portion, the smaller bore end of the sleeve being exterior of the crank case and the larger bore end of the sleeve being interior of the crank case and providing the only channel through which oil can enter the sleeve, a two diameter plunger slidable in the sleeve, the larger diameter portion of the plunger creating suction in the bearing between the smaller diameter portion and the sleeve during its stroke away from the junction of the two diameters of the sleeve bore, and one way valve means closing the oil outlet passage while the larger diameter portion of the plunger is moving away from the outlet passage.

HERBERT C. EDWARDS.